United States Patent [19]
Derkits, Jr. et al.

[11] Patent Number: 5,995,293
[45] Date of Patent: Nov. 30, 1999

[54] OPTICAL COMPONENTS HAVING MAGNETIC THIN FILMS FOR ORIENTATION AND METHOD OF ASSEMBLING SAME

[75] Inventors: Gustav Edward Derkits, Jr.; John VanAtta Gates, both of New Providence, N.J.

[73] Assignee: Lucent Technologies Inc., Murray Hill, N.J.

[21] Appl. No.: 09/012,622

[22] Filed: Jan. 23, 1998

[51] Int. Cl.$^6$ .............................. G02B 3/00; G02B 7/02
[52] U.S. Cl. ........................ 359/642; 359/814; 359/824
[58] Field of Search .................................. 359/642, 814, 359/824

[56] References Cited

U.S. PATENT DOCUMENTS 5,593,437  1/1997  Arita et al. .................................. 623/6

Primary Examiner—Scott J. Sugarman

[57] ABSTRACT

A self-orienting optical component advantageous for assembling sub-optical assemblies in which the components must be precisely aligned comprises a component having a magnetic film deposited on a portion of its outer surface so that a magnetic field applied adjacent the optical component will induce the optical component to move to a pre-determined orientation. Advantageously, the optical component also has further layers deposited on portions of its outer surface for aiding in adhesion, soldering, or light transmission. An improved method of assembling an optical subassembly comprises depositing a film of magnetic material over a portion of the outer surface of the optical component and applying a magnetic field to the optical component to induce it to move to a pre-determined orientation to aid in positioning it on a submount.

24 Claims, 5 Drawing Sheets

OPTICAL COMPONENTS HAVING MAGNETIC THIN FILMS FOR ORIENTATION AND METHOD OF ASSEMBLING SAME

FIELD OF THE INVENTION

The present invention relates to an optical component and more particularly, to an optical component having a magnetic film deposited on a portion of its outer surface for orientating the component with an applied magnetic field. The invention further involves methods of assembling optical components involving passive orientation of the components with use of a magnetic film and an applied magnetic field, which is particularly advantageous for assembling spherical and cylindrical optical components.

BACKGROUND OF THE INVENTION

In fabricating optical and optoelectronic devices, optical components need to be firmly attached to a substrate within the path of light. Such devices include lasers, p-i-n diodes, and assemblies of such devices with passive elements such as planar waveguides. Presently, methods for attaching the optical components to a substrate include aluminum oxide ("ALO") bonding, solder bonding, and solder-glass bonding. ALO bonding methods present many technical difficulties, including the need for high temperatures and high stress which have a tendency to produce defects such as cracks that can remain hidden for a long time and cause reliability problems. Another method of attachment includes epoxy bonding, but this has the disadvantage of relying upon use of organic materials which, when applied to optical components, can promote facet failure or moisture which likewise creates reliability problems.

Bonding of optical components is further complicated because the components often include objects such as spherical ball and cylindrical lenses which, due to their smooth outer surfaces, are difficult to handle. Soldering of the components requires depositing a metallization layer on their surfaces, which destroys the symmetry of the components and increases handling problems. Optical components used in laser communications systems or other systems involving gain media may be required to have specialized asymmetrical coatings on their surfaces for specific purposes, such as the avoidance of circulating rainbow or "whispering gallery" modes of spherical lenses, which can cause excess feedback and self-modulation. These asymmetrical components are particularly difficult to handle, as they often must be carefully attached during assembly on a substrate with the asymmetrical feature oriented in a precise alignment relative to the path of light. Challenges have been encountered in developing apparatus capable of placing the components with the required precision and also applying the pressure to them needed for bonding, as described, for example, in U.S. Pat. No. 5,194,105 issued Mar. 16, 1993, to Nguyen entitled "Placement and Bonding Technique for Optical Elements," assigned to AT&T Co., the predecessor of the assignee herein, which is hereby incorporated by reference. Pick-and-place tools for manual orientation and placement of optical components can be slow and expensive.

Given these challenges encountered with present methods of attachment, it is desirable to provide an optical component and method for attaching the optical component that minimizes difficulties associated with manually, precisely orienting the component. Advantageously, this method should exhibit high reliability and be compatible with existing technologies, such as solder bonding or thermocompression, already in use in packaging. The instant invention addresses these needs by providing a substantially self-orienting optical component which aids in assembly and methods for assembling a sub-optical assembly comprising passively orienting the component. Further advantages may appear more fully upon consideration of the description given below.

SUMMARY OF THE INVENTION

Summarily described, the invention comprises an optical component having a film of magnetic material deposited on a portion of its outer surface for orientating the component in response to an applied magnetic field. When a magnetic field is applied adjacent the optical component, the film of magnetic material will respond to the field to induce the component to move to a pre-determined orientation. Advantageously, the film of magnetic material is comprised of cobalt, nickel, iron, garnet, or ferrite, or an alloy comprising these materials. The optical component also may have further layers deposited on portions of its outer surface for aiding in adhesion, soldering, thermocompression bonding, or light transmission. In a preferred embodiment, the component has deposited over a portion of its outer surface: first, an adhesive layer comprised of titanium; second, a magnetic thin film layer comprised of cobalt; third, a barrier layer comprised of platinum; and fourth, a soldering layer comprised of one or more layers of material selected from the group consisting of gold and tin.

The invention also involves methods of assembling an optical subassembly comprising providing an optical component; depositing a film of magnetic material over a portion of the outer surface of the optical component; and applying a magnetic field to the optical component to induce it to move to a pre-determined orientation to aid in positioning it on a submount. The invention further embraces an optical sub-assembly comprising an optical component having a film of magnetic material bonded to a submount adjacent a laser.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention and are not to scale.

DETAILED DESCRIPTION OF THE INVENTION

Applicants have discovered that passive means of orientation may be used in the assembly of optical components so that the components may be properly oriented without use of active or manual means of orientation, thereby reducing the costs of handling and assembly of these components. The passive means of orientation involves depositing thin films of magnetic material on a portion of the surface of an optical component, which allows the component to self-orient in the presence of a spatially non-uniform magnetic field.

Figure 1:
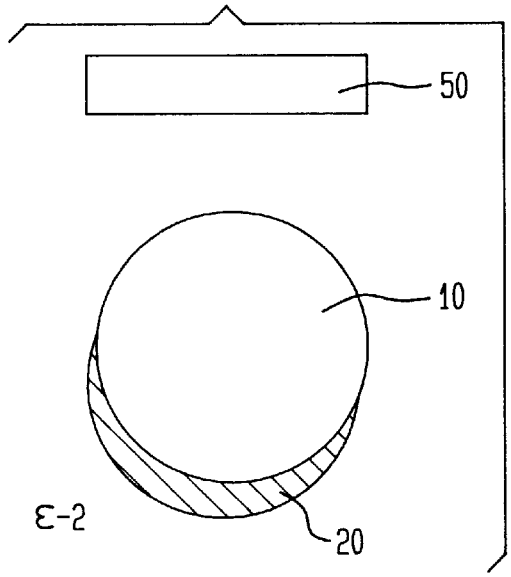
FIG. 1 shows a cross-sectional view of the inventive optical component having a magnetic thin film deposited over a portion of its surface.
Figure 2A:
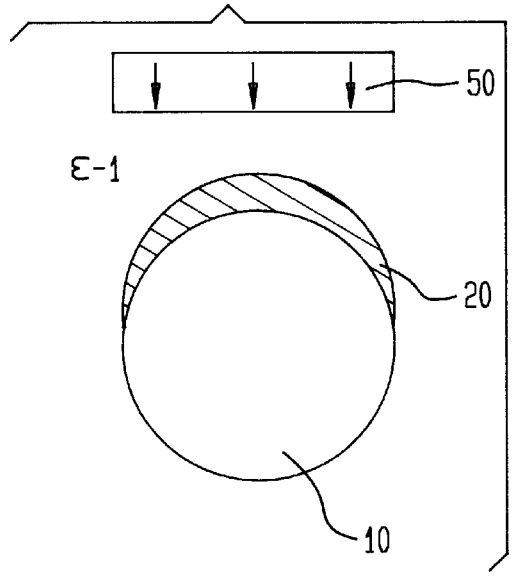
FIG. 2A shows a cross-sectional view of a ball lens in a spatially non-uniform magnetic field oriented so that the magnetic energy of the lens is maximized.
Figure 2B:
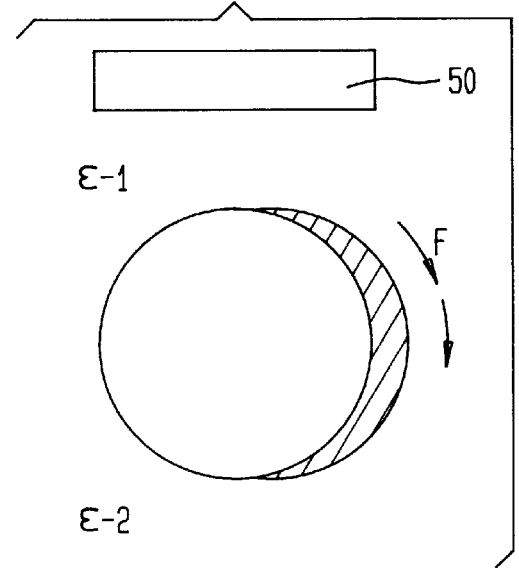
FIG. 2B shows a cross-sectional view of a ball lens in a spatially non-uniform magnetic field schematically illustrating the force orienting the ball lens.

More specifically with reference to the figures, FIG. 1 shows a component in the form of a ball lens 10 having a portion of its surface coated with a magnetic thin film 20. FIGS. 2A and 2B illustrate the self-orientation of this component in the presence of an applied magnetic field. In FIG. 2A, the ball lens 10 is shown with its magnetic thin film 20 in a position in the high field region of the non-uniform magnetic field produced by magnet 50. The interaction of the magnetic field with the magnetic material may be roughly described as an induced dipole interaction which is characterized by an energy level E1. In FIG. 1, the ball lens 10 is shown with its magnetic thin film 20 in a position in the low field region of the non-uniform magnetic field, characterized by an energy E2. Since the interaction energy E2<E1, a force F is exerted on the ball lens by the magnetic field, which is illustrated in FIG. 2B. The force F shifts the ball lens into the low field region of the field, thus orienting the ball as in FIG. 1.

The magnetic thin film may comprise any of a large number of ferromagnetic materials, including metallic elements such as cobalt, iron, or nickel or compounds such as garnets or ferrites. Examples of such materials comprise the following alloys and compositions: $SmFe_2$; Fe-20 weight % Ni; 70% Co-30% Fe; Fe-30% Cr-15% Co; the Fe—Al—Ni—Co alloy commonly known as Alnico; $Fe_3O_4$ ferrite; $TbFe_2$ and a $Tb_{0.28}Dy_{0.72}Fe_2$ alloy. The film of magnetic material also may comprise one or more layers of such materials, preferably interspersed with one or more layers fabricated with platinum or palladium. The orientation can be accomplished by use of a DC electromagnet or a high strength permanent magnet, i.e., 50, fabricated with materials such as Nd—Fe—B or $SmCo_5$. Examples of other materials that may be used to fabricate the magnets include Fe—Cr—Co, Fe—Al—Ni—Co (Alnico), Cu—Ni—Fe (Cunife), Co—Fe—V (Vicalloy), specially-processed, low-coercivity ($H_c$), rare earth cobalt (Sm—Co), or magnets comprising Ba-ferrite or Sr-ferrite.

This passive means of orientation may be used with highly symmetrical piece parts (e.g., ball or cylindrical lenses), is compatible with readily-available and reliable means of assembly (e.g., solder bonding), and enables incorporation of asymmetric features in the fabrication of the components. The magnetic thin film may be incorporated as one layer of a multilayer structure, with the multilayer structure comprising layers designed to achieve specific functions beyond orienting the structure, such as bonding the component to a substrate, adhering the layers together, or aiding in transmission of light rays passing through the component.

Figure 3:
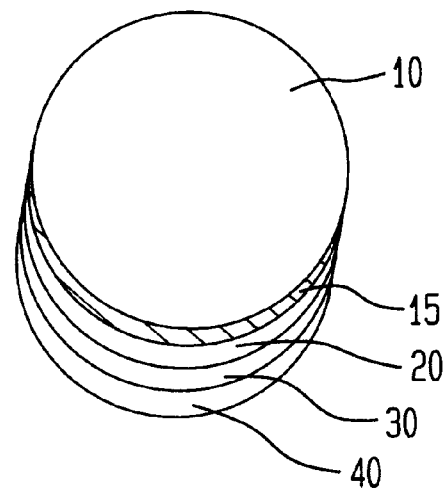
FIG. 3 shows a cross-sectional view of the inventive optical component having a multilayer thin film deposited over a portion of its surface in which one layer is magnetic and the other layers comprise adhesive and soldering layers.

More specifically with reference to the figures, FIG. 3 shows the ball lens 10 having a multilayer structure disposed thereon. First, an adhesive layer 15 is provided for securing the magnetic material to the outer surface of the component; second, the magnetic thin film layer 20, is provided for passively orienting the lens; third, a barrier layer 30 is provided for controlling penetration of a solder; and fourth, a soldering layer is provided over a portion of the exterior surface of the component for bonding the component to a substrate. In a preferred embodiment, the adhesive layer comprises a film of titanium in an approximate thickness of 500 Angstroms (Å); the magnetic layer comprises a film of cobalt having an approximate thickness of 5,000 Å; the barrier layer comprises a film of platinum having an approximate thickness of 2,000 Å; and the soldering layer comprises a layer of gold having an approximate thickness of 2,000 Å. In this embodiment, the titanium provides good adhesion of the metal film to the lens; the cobalt provides magnetic functionality; the platinum provides a good barrier to solder penetration; and the gold provides a clean, solderable surface.

Other materials known in the field for soldering may be used for fabricating the various layers. For example, besides titanium the adhesive layer may be comprised of chromium or molybdenum. The barrier layer advantageously may be comprised of a transition metal such as iron (Fe), nickel (Ni), cobalt (Co), or palladium (Pd). The soldering layer 40 of FIG. 3 may itself comprise a multilayer structure, e.g., alternating layers of gold, tin, and gold are advantageous, or alternating layers of lead and tin (Pb—Sn) may be used. Advantageous materials for use in the soldering of optical components are further described in U.S. patent application Ser. No. 08/955,686, entitled Method And Compositions For Achieving A Kinetically Controlled Solder Bond, filed Oct. 22, 1997, by Gustav E. Derkits, Jr., the inventor herein, and David Coult, assigned to Lucent Technologies, Inc., the assignee herein, which is hereby incorporated by reference. Also, one or more layers of ductile metal (e.g., gold, copper, silver, or aluminum), may be deposited over a portion of the exterior surface of the component for thermocompression bonding of the component to a substrate.

Figure 4A:
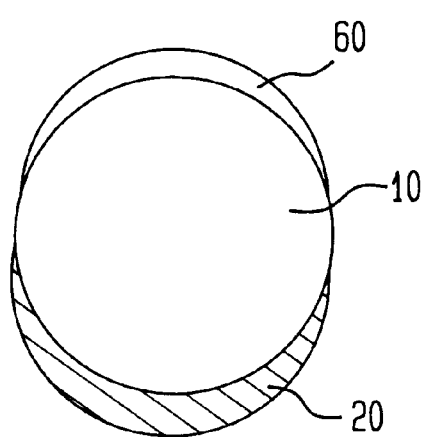
FIG. 4A shows a cross-sectional view of the inventive optical component having a magnetic thin film deposited over a portion of its surface and an additional thin film layer antipodal to the magnetic thin film comprising material having a higher index of refraction than the lens.
Figure 4B:
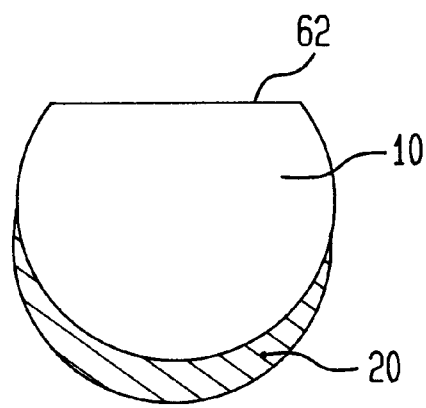
FIG. 4B shows a cross-sectional view of the inventive optical component having a magnetic thin film deposited over to a portion of its surface and in addition an area of the lens antipodal to the magnetic film from which lens material has been removed.

The optical component also may incorporate an additional thin film transmission layer 60 or removed section 62 antipodal to the magnetic thin film, as shown in FIGS. 4A and 4B, respectively, which serve a light-leak function. The transmission layer 60 is fabricated with a material having an index of refraction higher than the index of refraction of the material comprising the lens 10. In this way, light rays propagating along the surface of the lens will escape from, or be transmitted from, the lens. Exemplary materials for fabricating the transmission layer comprise $TiO_2$, Si, Ge, or $SiO_2$ doped with $GeO_2$ or one or more of Ge, Al, B, P, Ga, or La to raise the refractive index of the material. Likewise, the removed 62 layer allows for escape of surface-propagating rays. Standard etching techniques (liquid or plasma), may be used to remove the material. These features are advantageous for laser packaging applications requiring control over surface-propagating light rays.

Figure 5A:
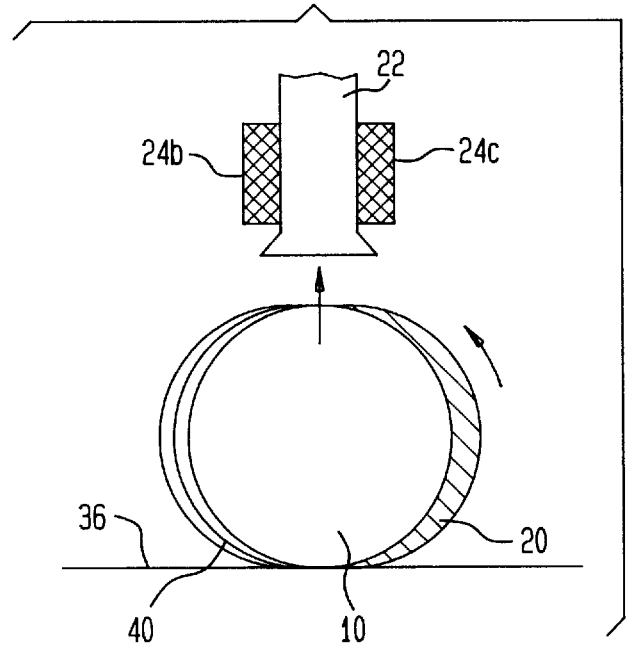
FIGS. 5A, 5B, and 5C show cross-sectional views of an optical component and pick-up tool illustrating one embodiment of the inventive method of assembly.
Figure 5B:
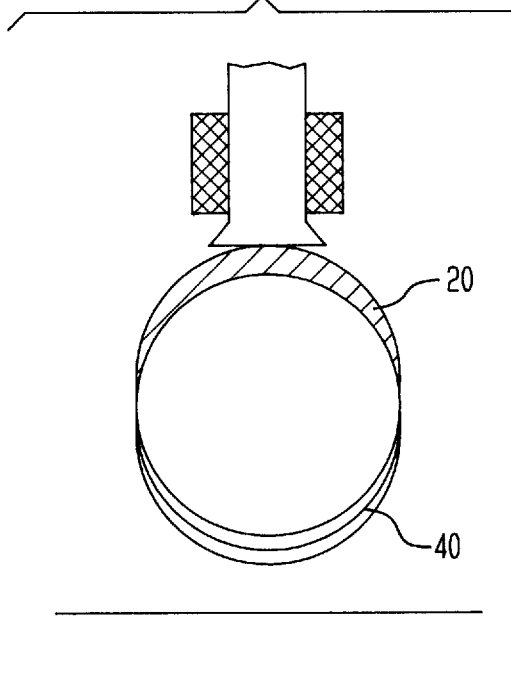
Figure 5C:
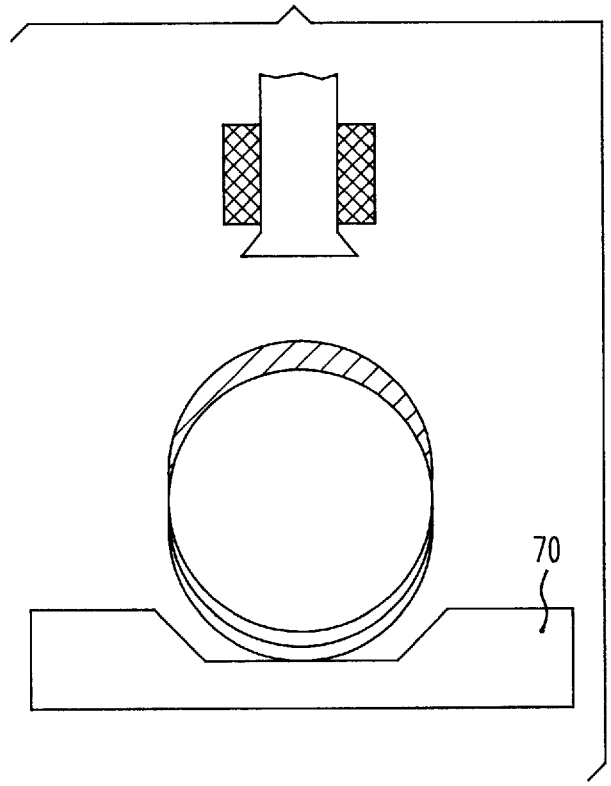

With the self-orientating optical component, the method of assembly can be simplified, the cost of handling and assembling these components decreased, and the speed of the assembly process increased. The soldering or transmission layers may be precisely aligned on a substrate by selective deposition of the magnetic layer, without having to manually or actively position the parts during assembly. For example, FIGS. 5A, 5B, and 5C illustrate one aspect of the assembly process involving use of a pick-up tool 22 having energized coils 24a, 24b. The component has a magnetic thin film layer 20 deposited on one portion of its outer surface and an antipodally-disposed soldering layer 40. The component is first placed on a flat surface 36 in the presence of a spatially-non-uniform magnetic field and agitated to provide sufficient energy to move it into orientation, as illustrated schematically in FIG. 5A; the component may need to be vibrated or rolled to provide sufficient kinetic energy to orient the component. The component is then picked from the surface using a pickup tool 22, as schematically illustrated in FIG. 5B. In this embodiment, the head of the pickup tool 22 has energized coils 24a, 24b or magnets attached to it so that the tool provides the magnetic field to orient the component, and the magnetic thin film itself acts as the handle of the component. In any case, the component is orientated into proper position and the tool simply picks up the component while in correct orientation. As schematically illustrated in FIG. 5C, the component is then placed in position over the substrate 70, the magnetic field generated by the coils 24a, 24b is deactivated, and the component is released from the tool into position on the substrate for bonding.

Figure 6A:
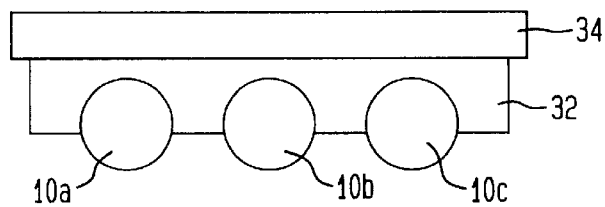
FIGS. 6A, 6B, 6C, 6D, 6E, and 6F show cross-sectional views illustrating an alternative embodiment of the inventive method of assembly involving use of a removable medium and a vacuum pick-up tool.
Figure 6B:
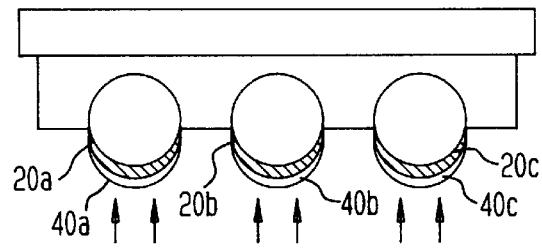
Figure 6C:
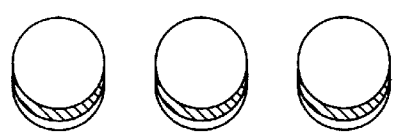
Figure 6D:
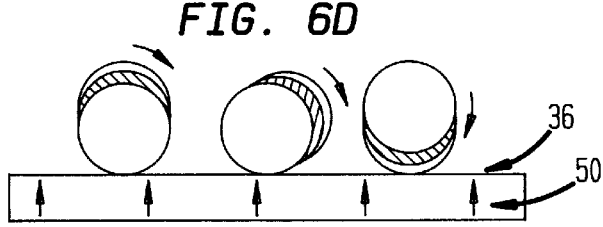
Figure 6E:
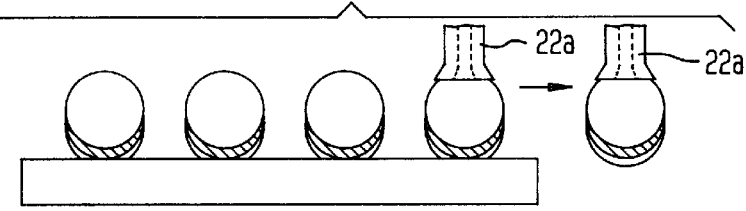
Figure 6F:
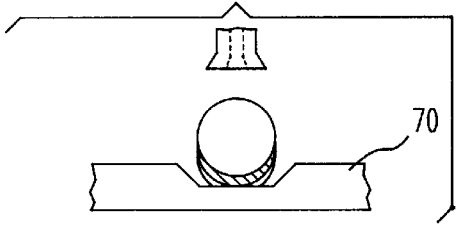

Coating of the magnetic thin film layer may be accomplished with use of a removable medium, as illustrated in FIGS. 6A–6F. Optical components 10a, 10b, 10c are first partially embedded in a removable medium 32, such as wax, secured to a plate 34 for stability, as shown in FIG. 6A. As can be seen, a portion of the outer surface of the optical components remains exposed. Thin films of magnetic material 20a, 20b, and 20c, and soldering layers 40a, 40b, and 40c, are next deposited over the exposed portions of the optical components, as shown in FIG. 6B. This deposition of the materials may be accomplished by means well-known to those skilled in the art of thin-film deposition, such as sputtering or electron-beam evaporation. Next, as illustrated in FIG. 6C, the optical components are removed from the medium 32. As shown in FIG. 6D, the components are next placed on a flat surface 36, agitated, and oriented into alignment by an applied magnetic field 50. Once properly aligned, a pick-up tool 22a is used to remove the components from the surface 36 and place them in position on a substrate 70, as shown in FIG. 6E. The pick-up tool 22a in this embodiment comprises a vacuum pick-up tool. Lastly, as shown in FIG. 6F, the component is placed in position on the substrate, released from the tool 22a, and bonded.

Figure 7A:
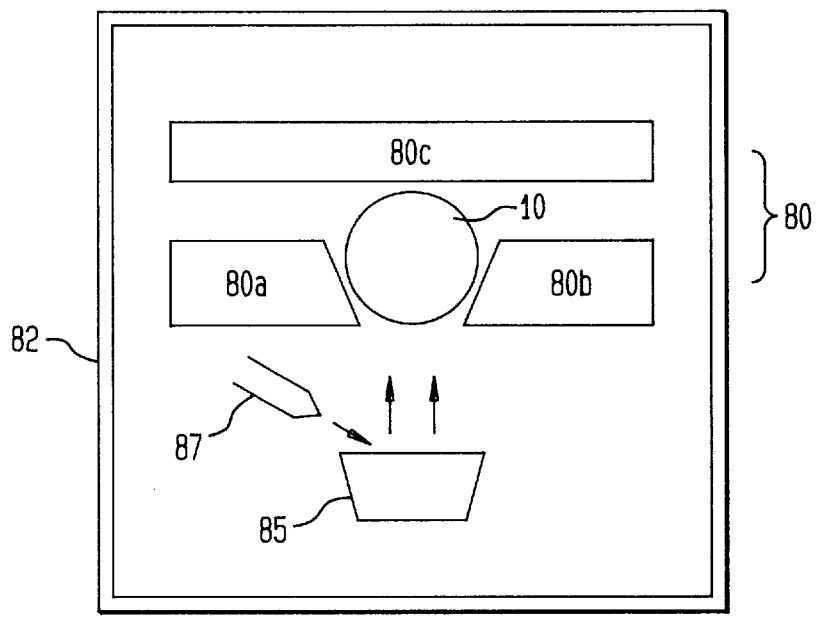
FIG. 7A shows a cross-sectional view of an alternative embodiment of the inventive method of assembly involving a lens held in a silicon wafer frame and metal vapor produced through electron-beam evaporation.
Figure 7B:
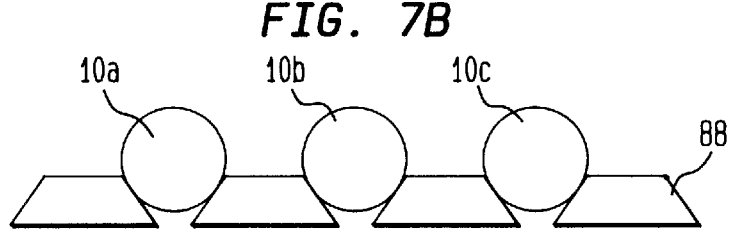
FIGS. 7B and 7C schematically illustrate a cross-sectional cut-away and top view, respectively, of a step of an alternative embodiment of the inventive method of assembly involving a plurality of ball lenses held in a single wafer frame.
Figure 7C:
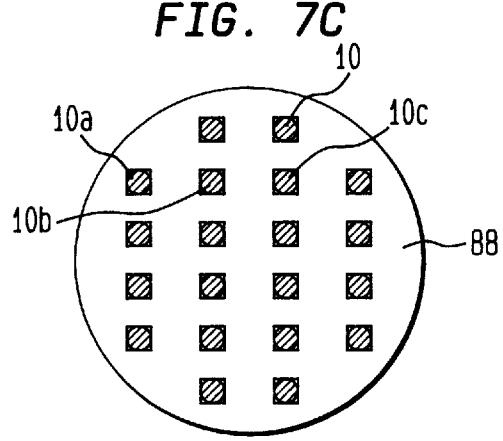

Referring to FIG. 7A, another method of assembly is illustrated. Here, the optical component 10 is placed in a frame 80 comprised of silicon wafers 80a, 80b, adjacent a plate 80c. In place of the plate 80c, two pairs of silicon wafers may be disposed on either side of the component (not shown). Preferably, a square cross-sectional hole in a wafer is used for the frame when the component comprises a ball lens, and a trough cross-sectional hole in a wafer is used when the component comprises a cylindrical lens. Also, a single wafer having many holes may be used as a frame to hold a large plurality of components as schematically illustrated in FIGS. 7B and 7C, which reflect a cross-sectional cut-away view and a top view, respectively, of a plurality of ball lenses 10a, 10b, 10c, held in a silicon wafer frame 88 having square cross-sectional holes. Lithography and etching techniques that may be used to produce the wafer holes are well-known to those skilled in the art. In any case, referring to FIG. 7A, the component as situated in the frame 80 is secured within a vacuum chamber 82 and the thin film of magnetic material is deposited over the exposed surface. Metal vapor may be produced from a pot source of material 85 by electron-beam bombardment generated by an electron gun 87.

Figure 8:
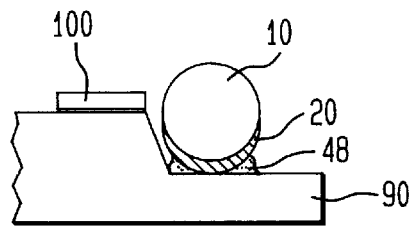
FIG. 8 shows a cross-sectional view of an optical sub-assembly.

It will be appreciated that the inventive optical components will generally be part of an optical sub-assembly of a communication system that further comprises such conventional elements as a laser, a submount, and photodiode. For example, FIG. 8 schematically illustrates a cross-sectional view of an optical sub-assembly comprising a laser 100 on a submount 90 with a ball lens 10 having a magnetic film 20 which is attached to the submount 90 by means of a solder bond 48.

It is understood that the embodiments described herein are merely exemplary and that a person skilled in the art may make variations and modifications without departing from the spirit and scope of the invention. For example, although the invention is illustrated with reference to ball or cylindrical lenses, it may be applied to other types of lenses requiring orientation during assembly. All such variations and modifications are intended to be included within the scope of the appended claims.

We claim:

1. An optical component having a film of magnetic material deposited on a portion of its outer surface for orientating the component in response to an applied magnetic field wherein when a magnetic field is applied adjacent the optical component, the film of magnetic material will induce the optical component to move to a pre-determined orientation, and further comprising a transmission layer disposed on a portion of the outer surface of the component wherein the transmission layer is fabricated with a material having an index of refraction higher than the index of refraction of the material comprising the component and is disposed substantially antipodally to the film of magnetic material so that the transmission layer allows light rays propagating along the surface of the component to escape from the component.

2. An optical component having a film of magnetic material deposited on a portion of its outer surface for orientating the component in response to an applied magnetic field wherein when a magnetic field is applied adjacent the optical component, the film of magnetic material will induce the optical component to move to a pre-determined orientation, and further comprising a soldering layer deposited over a portion of the exterior surface of the component for fixedly bonding the component to a substrate in a certain orientation.

3. The component of claim 2, further comprising a layer of ductile metal deposited over a portion of the exterior surface of the component for thermocompression bonding of the component to a substrate.

4. The assembly of claim 2, further comprising a barrier layer disposed on the surface of the soldering layer for controlling the penetration of the solder.

5. The assembly of claim 2, in which the soldering layer is deposited over the film of magnetic material so that the magnetic material is sandwiched between the optical component and the soldering layer.

6. The assembly of claim 2, in which the soldering layer comprises one or more layers of materials selected from the group consisting of gold, lead, tin, and platinum.

7. The assembly of claim 4, wherein the barrier layer is fabricated from a metal selected from the group consisting of platinum, palladium, and rhodium.

8. An optical component having a film of magnetic material deposited on a portion of its outer surface for orientating the component in response to an applied magnetic field wherein when a magnetic field is applied adjacent the optical component, the film of magnetic material will induce the optical component to move to a pre-determined orientation, in which the magnetic material comprises cobalt, and further comprising an adhesive layer comprised of titanium sandwiched between the optical component and the film of magnetic material for securing the magnetic material to the outer surface of the component; a barrier layer comprised of platinum disposed over the magnetic material; and a soldering layer comprised of one or more layers of gold or tin disposed over the barrier layer for bonding the component to a substrate.

9. A method of assembling an optical sub-assembly comprising bonding an optical component to a substrate, the method comprising the steps of:

providing an optical component;

depositing a film of magnetic material over a portion of the outer surface of the optical component, wherein the film of magnetic material is so configured on the optical component that it enables the optical component to passively self-orient in response to an applied non-uniform magnetic field, and applying a magnetic field to the optical component so that the magnetic field in cooperation with the film of magnetic material induces the optical component to move to a pre-determined orientation relative to the substrate; and bonding the optical component in a fixed position to the substrate.

10. The method of claim 9, further comprising the steps of:

contacting the film of magnetic material with an electromagnet and activating the electromagnet to cause the component to adhere to the electromagnet;

moving the electromagnet and attached optical component adjacent a pre-determined location on a submount; and deactivating the electromagnet to release the optical component onto the submount.

11. The method of claim 9, further comprising the step of depositing a soldering layer over a portion of the exterior surface of the component for bonding the component to a submount.

12. The method of claim 9, in which the step of depositing the film of magnetic material comprises the steps of:

embedding the optical component in a removable medium so that a portion of the outer surface of the optical component is exposed;

coating the exposed portion of optical component with magnetic material; and separating the optical component from the removable medium.

13. A method of assembling an optical sub-assembly of a communications system comprising the steps of:

providing an optical component;

depositing a film of magnetic material over a portion of the outer surface of the optical component; and applying a magnetic field to the optical component so that the magnetic field in cooperation with the film of magnetic material induces the optical component to move to a pre-determined orientation, in which the step of depositing the film of magnetic material comprises the steps of:

securing the optical component in a frame having a via hole for exposing a portion of the surface of the optical component;

placing the frame in a vacuum chamber;

releasing magnetic material over the via hole to thereby coat the exposed portion of the surface of the optical component.

14. The method of claim 13, in which the frame is fabricated from one or more silicon wafers and the step of releasing the magnetic material comprises sputtering or electron-beam evaporation.

15. An optical component having a thin film of magnetic material deposited on a portion of its outer surface, the thin film of magnetic material being configured on the portion of the optical component so that it enables the optical component to passively self-orient in response to an applied non-uniform magnetic field.

16. The optical component of claim 15, in which the component is selected from a spherical ball lens and a cylindrical lens.

17. The optical component of claim 15, in which the film of magnetic material comprises a layer of metal selected from the group consisting of cobalt, nickel, iron, and alloys comprising cobalt, nickel, and iron.

18. The optical component of claim 17, comprising a plurality of metal layers interspersed with one or more layers fabricated with platinum or palladium.

19. The optical component of claim 15, in which the film of magnetic material comprises a garnet or ferrite material.

20. The component of claim 15, further comprising an adhesive layer sandwiched between the optical component and the film of magnetic material for securing the magnetic material to the component.

21. The component of claim 20, in which the adhesive layer is fabricated with a metal selected from the group consisting of titanium, chromium, and molybdenum.

22. The component of claim 15, in which a portion of the material comprising the surface of the optical component is removed antipodal the magnetic material for allowing light rays propagating along the surface of the component to be transmitted to the exterior of the component.

23. The component of claim 15, in which a portion of the material comprising the surface of the optical component is removed antipodal the magnetic material for allowing light rays propagating along the surface of the component to be transmitted to the exterior of the component.

24. A communications system comprising the optical component of claim 15.

* * * * *